United States Patent Office 3,235,763
Patented Feb. 15, 1966

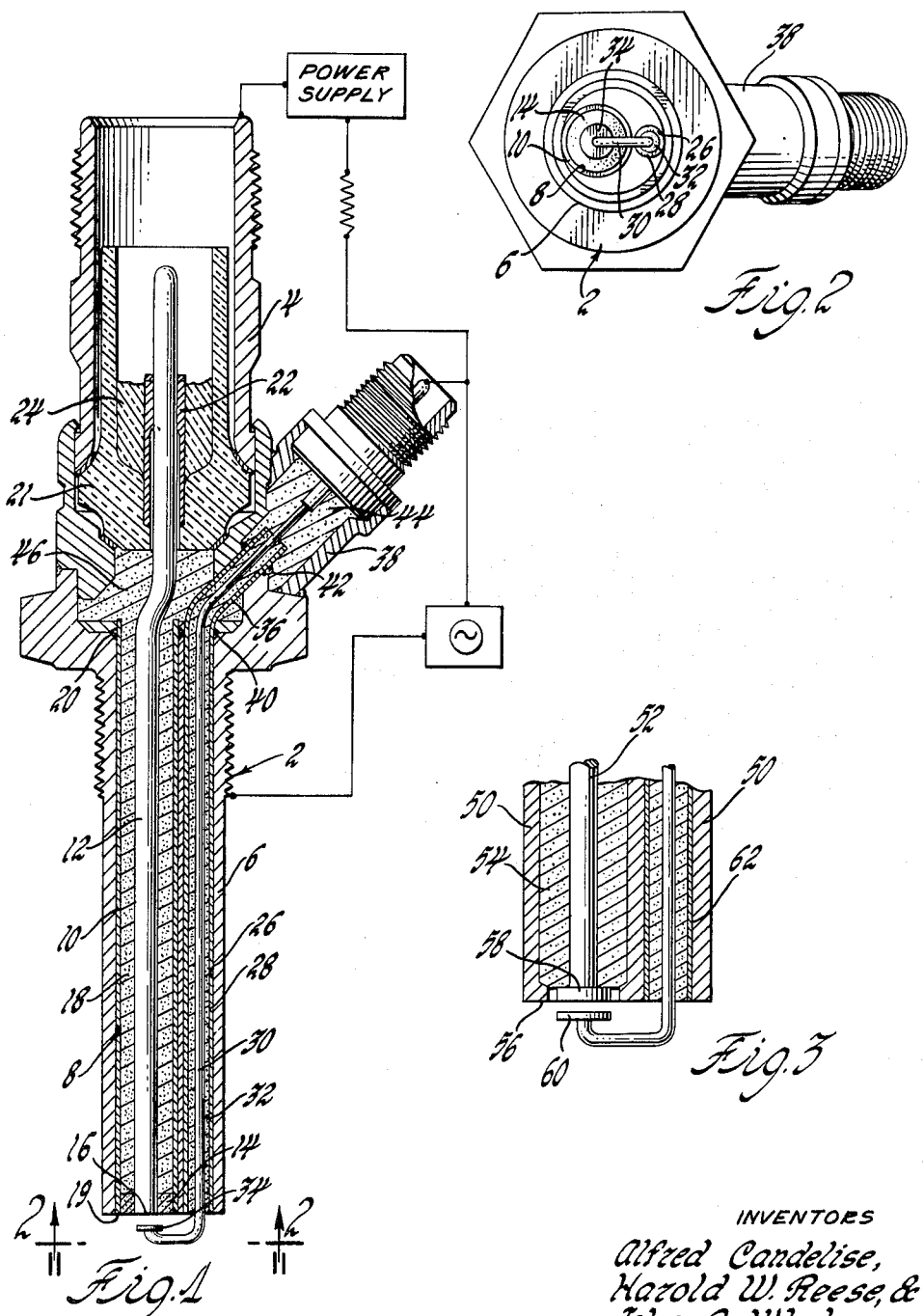
Feb. 15, 1966 A. CANDELISE ETAL 3,235,763
IGNITER PLUG WITH SPARK-SENSING PROBE
Filed Sept. 15, 1960
INVENTORS
Alfred Candelise,
Harold W. Reese, &
John A. Whaley
Paul J. Reising
ATTORNEY

3,235,763
IGNITER PLUG WITH SPARK-SENSING PROBE
Alfred Candelise, Harold W. Reese, and John A. Whaley, Flint, Mich., assignors to General Motors Corporation, Detroit, Mich., a corporation of Delaware
Filed Sept. 15, 1960, Ser. No. 56,241
6 Claims. (Cl. 313—134)

This invention relates to an igniter plug, useful for rocket and jet engines, having means to accurately detect and indicate the occurrence of arcing across the igniter spark gap.

It is desirable that igniters, and particularly igniters for rocket-propelled missiles, be equipped with some means whereby it can be known whether the igniter is operative prior to admission of the fuel to the rocket engine's combustion chamber and also during the flight of the missile. One such means comprises a probe extending into spaced relationship with one of the igniter electrodes at the spark gap such that a voltage can be applied across the gap between the probe and the one of said electrodes which voltage is insufficient to cause conductance between the probe and the one electrode in the absence of arcing between the two igniter electrodes but which is sufficient to cause conductance between the probe and the one electrode upon the occurrence of arcing in the gap between the igniter electrodes. Hence, when used with a suitable circuit to measure the conductance between the probe and the one electrode, the probe is effective to indicate whether the igniter is operating to furnish the desired arcing in the spark gap. Readings from the probe can be taken prior to admission of the fuel to the rocket engine and can also be telemetered back to earth during flight of the missile. It will be obvious, however, that the value of such a system is dependent upon its ability to accurately transmit the information sensed by the probe.

It is an object of the present invention to provide an igniter plug with spark-sensing probe of the type described and having an improved structure which better assures that the readings obtained from the probe are an accurate indication of the occurrence or nonoccurrence of arcing in the spark gap. More specifically, it is an object of the present invention to provide an igniter with a spark-sensing probe of the type described wherein the electric lead to the probe is completely shielded by metal from the electromagnetic and electrostatic fields of the electrical lead to the igniter thereby assuring against inaccurate readings from the probe which would otherwise result by way of induced currents and voltages from the electromagnetic and electrostatic fields. These and other objects of the invention will appear more clearly from the following detailed description of preferred embodiments thereof which will be made with reference to the accompanying drawings in which:

FIGURE 1 is a side view in section of one embodiment of the invention and, in addition, shows schematically a suitable circuit for the spark detector;

FIGURE 2 is a bottom view of the embodiment shown in FIGURE 1; and

FIGURE 3 is a side view in section of the bottom portion of another embodiment of the invention.

Referring now to FIGURE 1, the igniter plug shown has a metal shell 2 with an enlarged upper portion 4 at the terminal end of the plug and a lower portion 6 at the firing end of the plug. A relatively large through-bore 8 in lower shell portion 6 communicates with the opening in the upper shell portion 4.

Extending through the bore 8 is an assembly comprising a metal tube 10, a metal centerwire 12 which extends concentrically through the tube, an annular mass of semi-conductive material 14 which extends between and is bonded to the lower portions of the tube and the lower portion 16 of the centerwire, and a compacted mass of particulate insulating material 18, such as magnesium oxide, which fills the remaining portions of the tube 10 and serves as an electrical insulator between the centerwire 12 and the shell. Hence, the igniter plug shown in FIGURE 1 is of the low tension or so-called creep gap type, the spark gap being formed between the lower centerwire portion 16 which serves as the center electrode, and the lower end 19 of the shell, which serves as the ground electrode, such that the arcing occurs across the outer exposed surface of the annular mass of semi-conductor material 14. The particular material used for the semi-conductor mass 14 forms no part of the present invention; however, we prefer to use silicon nitride bonded silicon carbide as covered by copending patent application S.N. 801,238 filed Mar. 23, 1959, now Patent No. 3,052,814 and assigned to the assignee of the present invention. Metal tube 10 is not essential to the practice of the present invention; however, it is desirable in that it facilitates manufacture of the device. That is, the subassembly of the centerwire 12, the tube 10, the packed insulator material 18 and the semi-conductor mass 14 can be manufactured as a subassembly and then inserted into and secured within the shell as by a brazed joint such as shown at 20. However, once the assembly is complete it will be understood that the tube 10 functions as a part of the metal shell, the lower end of tube 10 therefore functioning as a part of the ground electrode.

The upper end of centerwire 12 extends into the enlarged shell portion 4 where it serves as an electrical connector for the igniter, a tubular ceramic insulator 21 serving to electrically separate the centerwire from the upper end of the shell. The upper end of the centerwire is sealed within the insulator 21 by means of a metal sleeve 22 and an annular mass of glass 24 having a coefficient of expansion substantially matching that of the sleeve, this seal construction being covered by United States Patent 2,939,983 issued to Earl W. Pierce and Harley E. Fortier and assigned to the assignee of the present invention.

Further, and in accordance with the invention, the lower portion 6 of the metal shell is provided with a second through-bore 26 which is of relatively small diameter and extends parallel and to one side of bore 8. Extending through the bore 26 is an assembly comprising a steel tube 28, probe lead wire 30 and packed ceramic powder insulating material 32, such as magnesium oxide, which electrically insulates the wire 30 from the tube and from the metal shell in which it is secured. The lower portion of wire 30 exterior of the igniter shell is curled inwardly and then upwardly and is shaped with a flat disc portion 34 at the end thereof, the periphery of which is located below and in spaced concentric relationship with the ground electrode 19 to thereby serve as the spark-sensing probe.

The upper end of the subassembly of metal tube 28, probe wire 30 and insulator 32 is bent outwardly, as shown at 36, and communicates with the opening in a somewhat laterally extending shell portion 38 which serves as the electrical terminal connection for the probe wire. The metal tube 28 is brazed to the shell at two locations, 40 and 42, and the entire space between the terminal end of the probe wire and shell portion 38 is filled with a suitable ceramic cement 44 to thereby insulate the wire and secure it against movement due to vibration. It is desirable to also fill the space within the shell below insulator 21 with similar cement as shown at 46 to complete the electrical insulation around the centerwire 12 and to secure it against vibration.

Particular attention is directed to the fact that in the structure shown and described, all portions of the probe wire 30 within the metal shell are completely surrounded by a metal jacket which separates the probe wire from the igniter centerwire and which thereby serves as a shield for the probe wire against the current and voltage inducing effects of the electromagnetic and electrostatic fields of the centerwire. In the embodiment shown, the metal jacket which serves as the shielding is formed, at the lower portion of the probe wire, by the lower portion of the igniter shell and by the tube 28, and at the upper end of of the probe wire by the upper portions of the tube 28 and by the laterally extending shell portion 38. Actually, from the standpoint of having complete shielding around the probe wire, the portions of the tube 28 which are within the bore 26 of the shell are not essential since the shell itself serves as shielding for such portions of the probe wire as are within the bore; however, from the standpoint of manufacturing ease and for best assurance of complete shielding it is desirable that the structure shown be used, with the metal tube 28 extending to the bottom of the shell. Such structure renders the quality of the brazed or welded joints 40 and 42 less important to the attainment of complete and effective shielding around the probe wire. If desired, the shell portion 6 can be made with but a single large bore to accommodate the centerwire together with its insulation and the probe wire subassembly. In such an embodiment it is, of course, essential to the practice of the invention that the metal tube surrounding the probe wire extend completely to the bottom of the shell since it alone serves as the shielding where but a single shell bore is used.

The circuit shown in FIGURE 1 comprises a power source, such as a 110 v. D.C. battery, at one side connected to the igniter shell 2 and at the other side connected through a resistor to the probe 34. An oscilloscope or other sensitive voltage detection means is connected across the igniter shell and the lead from the resistor to the probe.

Operation is as follows: Voltage from the power source is applied across the gap between ground electrode 19 and probe 34, this voltage being insufficient to cause conduction across the gap in the absence of the ionization which occurs by way of arcing between the center electrode 16 and the ground electrode, but sufficient to cause conduction between the probe and the ground electrode during the occurrence of arcing between the centerwire and the ground electrode. Hence, while the igniter plug is inoperative, the oscilloscope will indicate 110 v., there being no conductance across the probe-to-ground electrode gap. However, when the igniter is operative to cause arcing across the center electrode-to-ground electrode gap, ionization allows current flow across the probe-to-ground electrode gap thereby creating a voltage drop in circuit which is detected by the oscilloscope. Because the voltage drop is usually very small, it is extremely important that the entire system be such as to preclude voltage variation in the circuit from causes other than that intended to be detected, i.e., arcing with resultant ionization in the center electrode-to-ground electrode gap. Hence, it is that the provision of the metal shielding around the probe lead wire, in accordance with the invention, is important to attaining reliability and accuracy in the performance of the system.

The embodiment shown in FIGURE 3 is identical to that shown in FIGURES 1 and 2 except that it comprises a high tension igniter with a conventional unitary ceramic insulator. In this FIGURE 3 embodiment 50 is the metal shell, 52 the igniter centerwire and 54 a high-alumina ceramic insulator, the spark gap being from between the inwardly turned lower end of the shell, what serves as the ground electrode 56, and head portion 58 formed at the end of the centerwire. The probe 60 together with its lead and supporting subassembly is identical to that shown in FIGURE 1, both the shell itself and metal tube 62 serving as shielding around the probe lead to prevent the electromagnetic and electrostatic fields of the centerwire from having any distorting influence on the reading provided by the probe.

Hence, it will be understood that the invention is applicable to high tension as well as low tension type igniters, and that various changes and modifications in structure can be made, all within the scope of the claims which follow.

What is claimed is:

1. In an igniter plug having a centerwire serving as the electrical lead to a center electrode in spark gap relationship to a ground electrode and a metal wire electrically insulated from said center electrode and from said ground electrode and serving as the electrical lead to a spark-sensing probe which is in spaced relationship to one of said electrodes, the improvement which comprises a metal casing surrounding said metal wire and separating said metal wire from the centerwire to thereby electromagnetically and electrostatically shield said metal wire from said centerwire.

2. In an igniter plug having a metal shell with one end thereof formed to serve as a ground electrode, a centerwire extending through and insulated from said shell to serve as the electrical lead to a center electrode which is in concentric spark gap relationship to the ground electrode and a metal wire extending through said shell electrically insulated from said center electrode and from said ground electrode and serving as the electrical lead to a spark-sensing probe in spaced relationship to one of said electrodes, the improvement which comprises metal shielding surrounding said metal wire and separating said metal wire from the centerwire to prevent the electromagnetic and electrostatic field effects of said centerwire from inducing current in said metal wire.

3. An igniter plug as set forth in claim 2 and wherein the shell is shaped to form at least a portion of said metal shielding.

4. In an igniter plug having a metal shell with a ground electrode at one end thereof, a centerwire extending through said shell serving as the electrical lead to a center electrode in spark gap relationship to a ground electrode, and a metal wire extending through said shell serving as the electrical lead to a spark-sensing probe which is in spaced relationship to one of said electrodes, the improvement which comprises as elongated metal casing surrounding said metal wire and separating said metal wire from the centerwire to thereby shield said metal wire from the centerwire and packed powdered ceramic material in said casing insulating said wire from said casing and from said shell.

5. An igniter plug comprising an elongated metal shell having a bore therethrough, a centerwire extending through said bore in concentric relationship therewith, an annular mass of semi-conductive material between the end of said centerwire and the adjacent end of said shell thereby forming a low tension spark gap between the end of said centerwire and said shell, a spark-sensing probe extending into spaced relationship with said shell adjacent said spark gap and an electrical lead for said probe extending through said shell and electrically insulated from said shell and from said centerwire, said lead wire being separated from said centerwire by metal shielding to prevent the electromagnetic and electrostatic field effects of said centerwire from inducing current in said lead wire.

6. An igniter plug comprising an elongated metal shell having a pair of bores therethrough, a centerwire extending through one of said bores in concentric relationship therewith, an annular mass of semi-conductive material between the end of said centerwire and the adjacent end of said shell thereby forming a low tension spark gap between the end of said centerwire and said shell, ceramic insulating material on said one bore electrically separating said centerwire from said bore, a spark-sensing probe extending into spaced relationship with said shell adjacent the spark gap, a metal tube in the other of said bores, an electrical lead wire for said probe extending through said tube and ceramic powder insulating material in said tube electrically separating said wire from said tube and from said shell.

References Cited by the Examiner

UNITED STATES PATENTS

| | | | |
|---|---|---|---|
| 2,284,495 | 5/1942 | Rishell | 313—239 |
| 2,441,932 | 12/1949 | Reitz et al. | 313—239 |
| 2,937,296 | 5/1960 | Logan | 313—51 |
| 2,963,620 | 12/1960 | Knudson et al. | 315—35 |
| 2,969,500 | 1/1961 | Andert | 324—17 |

ELI LIEBERMAN, *Acting Primary Examiner.*

ARTHUR GAUSS, RALPH G. NILSON, GEORGE N. WESTBY, *Examiners.*